US006562467B2

(12) United States Patent
Remmert et al.

(10) Patent No.: US 6,562,467 B2
(45) Date of Patent: May 13, 2003

(54) CORROSION AND UV RESISTANT ARTICLE AND PROCESS FOR ELECTRICAL EQUIPMENT

(75) Inventors: Scot E. Remmert, Mt. Pulaski, IL (US); Douglas L. Ketterer, Bloomington, IL (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/908,249

(22) Filed: Jul. 18, 2001

(65) Prior Publication Data

US 2003/0017344 A1 Jan. 23, 2003

(51) Int. Cl.[7] .......................... B32B 27/38; B32B 27/40; B32B 27/36; B05D 3/02; B05D 5/12

(52) U.S. Cl. .................... 428/414; 428/423.1; 428/480; 428/332; 428/334; 428/341; 427/386; 427/410; 427/299; 427/58

(58) Field of Search ................................ 428/413, 414, 428/416, 418, 423.1, 480, 332, 334, 341; 427/384, 386, 410, 299, 58

(56) References Cited

U.S. PATENT DOCUMENTS

| | | | | |
|---|---|---|---|---|
| 3,979,704 A | | 9/1976 | Buckley et al. | |
| 4,298,656 A | | 11/1981 | Mendelsohn | |
| 5,178,902 A | | 1/1993 | Wong et al. | |
| 5,300,336 A | | 4/1994 | Wong et al. | |
| 5,433,773 A | * | 7/1995 | Harelstad | 106/14.13 |
| 5,472,523 A | * | 12/1995 | Harelstad | 148/247 |
| 6,027,579 A | * | 2/2000 | Das et al. | 106/14.12 |

OTHER PUBLICATIONS

3M Scotchkote "Fusion Bonded Epoxy Coatings" Brochure, 2000, Corosion Protection Products, Austin, Texas.

3M Scotchkote "134 Fusion Bonded Epoxy Coating" Brochure, 1999, Corrosion Protection Products, Austin, Texas.

3M Scotchkote "134 Fusion Bonded Epoxy Coating: Information, Properties and Test Results" Brochure, 2000, Corrosion Protection Products, Austin, Texas.

3M Scotchkote "134/135 Fusion Bonded Epoxy Coating" Brochure, 2000, Corrosion Protection Products, Austin, Texas.

* cited by examiner

*Primary Examiner*—Robert Dawson
*Assistant Examiner*—Michael J Feely
(74) *Attorney, Agent, or Firm*—Martin J. Moran

(57) ABSTRACT

A corrosion and ultraviolet ray resistant composite coated article (46) for use in or to contain electrical equipment is made by first cleaning an uncoated article (10) at a cleaning station (14), and then successively passing the cleaned article through wash workstation (16) phosphate bond coating workstation (18), wash workstation (22), non-chrome sealant coating workstation (24), drying workstation (26), heating workstation (30), epoxy resin coating workstation (32), and exterior painting workstation (40) by any type of transport system (12, 36), where the epoxy coated article can be passed again through previous workstations (14, 16, 18, 22, 24, 26, 30, 34) before final painting at workstation (40).

17 Claims, 1 Drawing Sheet

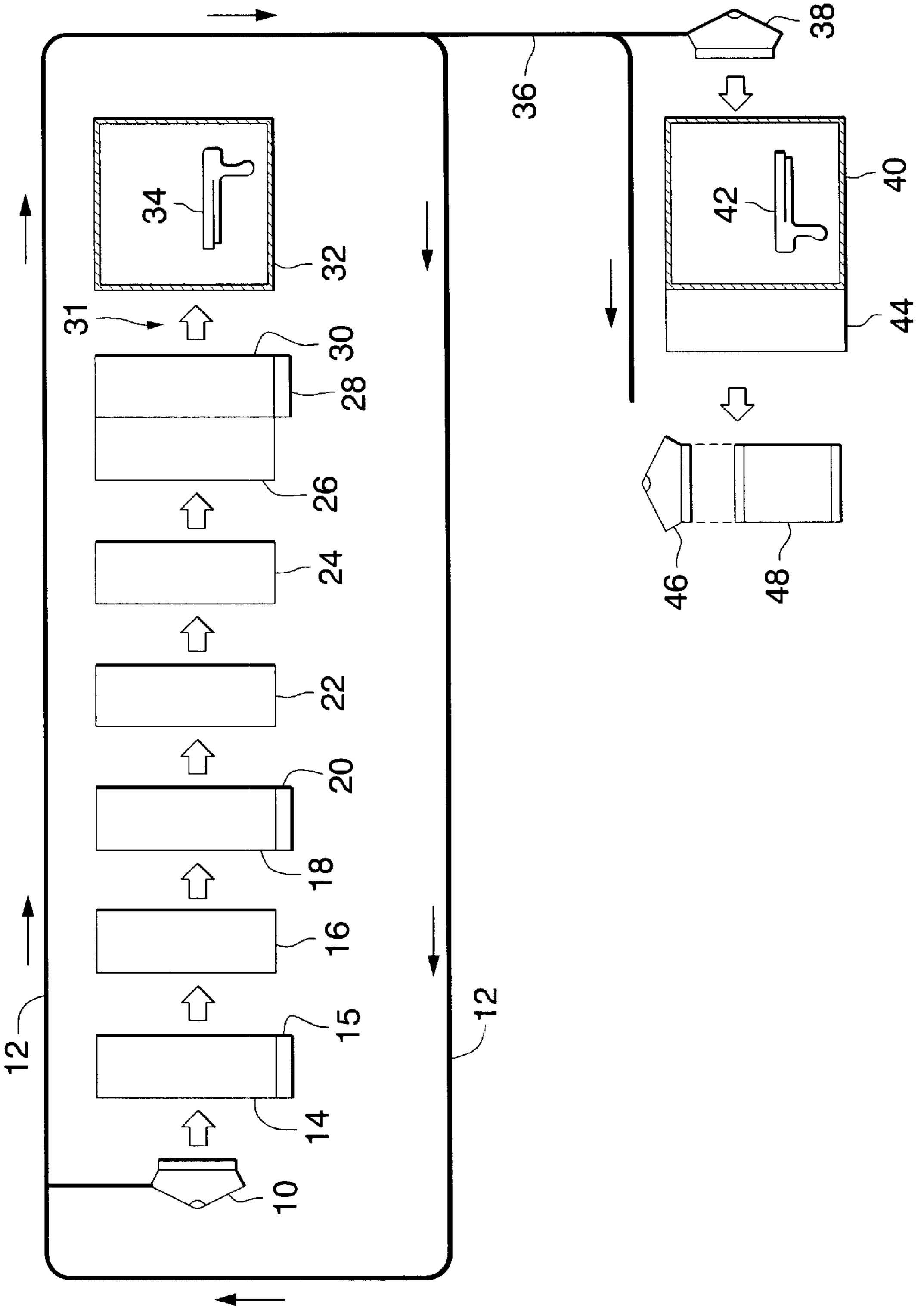
10
12
12
14
15
16
18
20
22
24
26
28
30
31
32
34
36
38
40
42
44
46
48

CORROSION AND UV RESISTANT ARTICLE AND PROCESS FOR ELECTRICAL EQUIPMENT

BACKGROUND OF THE INVENTION

1. Field of the Invention

This invention relates to composite coatings which are resistant to both corrosion and ultraviolet ("UV") radiation for exterior and interior components, such as transformers, circuit breakers, and the like, with their associated housings used in electrical equipment, particularly for outdoor electrical equipment and associated components.

2. Background Information

Protective coatings for electrical equipment are well known in the art, and taught, for example, by U.S. Pat. Nos. 3,979,704 and 4,298,656 (Buckely et al. and Mendelsohn, respectively), the former relating to a composite coating, with a rough zinc or iron phosphate layer covered by a zinc chromate or dichromate layer for metallic contacts, and sensing, tripping and supporting circuit breaker members. The latter patent relates to sprayable, flexible, crack-resistant, adhesive bracing compositions, for generator stator end windings, where the compositions are made from a mixture of bisphenol A epoxy resin, butadiene/acrylonitrile polymer, coloring pigment, thixotropic agent, and curing agent.

In other areas, U.S. Pat. Nos. 5,178,902 and 5,300,336 (both Wong et al.) teach protective coatings for metal pipes, the coating having an epoxy resin primer layer next to the pipe surface, a polyolefin (polyethylene, polypropylene) exterior sheath, and an interlayer mixture of epoxy and polyolefin. In the application process, the pipe is surface blast cleaned, washed to remove metallic dust and heated to between 175° C. and 275° C., then the three layers are applied in a single electrostatic powder application booth where the resin particles fuse bond to each other. Post heating can also be utilized followed by a water quench.

A series of brochures by 3M: 3*M*™ *Scotchkote*™ *Fusion Bonded Epoxy Coatings* (2000), pp. 1–11; 3*M Scotchkote*™ 134 *Fusion Bonded Epoxy Coating* (1999), pp. 1–4; 3*M Scotchkote*™ 134 *Fusion Bonded Epoxy Coating-Information, Properties and Test Results,* (2000), pp. 1–12; and 3*M Scotchkote*™ 134/135 *Fusion Bonded Epoxy Coating* (2000), pp. 1–4, disclose epoxy powder coating compositions which offer corrosion resistance protection to metals and which can be applied by fluidized bed, air spray, or electrostatic spray techniques which can be used over Scotchkote™ liquid phenolic resin primer and which can be over-coated with other materials for abrasion resistance, UV protection and impact protection via a cellular structure. These components may comprise epoxy resin, curing agent, pigments, catalysts, filler, and flow control agents uniformly mixed into each discrete particle. These coatings can be applied to piping, pump housings, valves, flow meters, ladders, wire mesh, and rebar rods, among other articles.

Multilayer polyolefin systems containing a base fusion bonded epoxy layer, a polyethylene or polypropylene adhesive intermediate layer and a polyethylene or polypropylene topcoat are also described. General application steps are removal of oil or grease, abrasive blast clean, pre-heat, deposit the fusion bonded epoxy powder, cure by heating, and a final inspection. For internal pipe coating a liquid epoxy primer is applied after abrasive blast cleaning. To add color the finished product can be coated with alkyd paint, acrylic lacquer or acrylic enamel.

While many epoxy coatings provide excellent corrosion resistance, and in many instances, in order to provide superior long-term corrosion resistance, stainless steel is used adding substantially to costs, what is needed in the industry is an inexpensive composite coating with even more enhanced, long-range corrosion resistance for extreme outdoor conditions, which coating will also provide excellent UV resistance, and which can also be used for interior applications.

SUMMARY OF THE INVENTION

Therefore, it is a main object of this invention to provide an article and process involving composite coating metal articles, usually galvanized steel, to provide superior toughness and weatherability and excellent UV resistance, eliminating the need to use expensive stainless steel components. It is another main object of this invention to provide an article and process involving composite coating steel or other articles to provide corrosion resistance for internal and external parts used in electrical equipment and associated components but not expected to carry current.

These and other objects are met by providing an article suitable for use in or to contain electrical equipment comprising: a metal article having successive coating layers of an inner layer of phosphate; non-chrome sealant effective to fill pores in the phosphate layer; thermoset, filled, epoxy resin; phosphate; non-chrome sealant effective to fill pores in the phosphate layer; thermoset, filled, epoxy resin; and an outer layer of pigment-containing paint resistant to ultraviolet rays.

Preferably, total application of all the coating layers is from about 10 to 30 milligrams per square foot (0.9 to 2.8 milligrams per sq. meter), with the outer paint layer being a polyester/polyurethane paint having a thickness of from about 0.030 mm to about 0.090 mm. Preferably, the metal article is galvanized steel.

The invention also resides in a method of coating a metal article comprising: (a) cleaning the metal article with an alkali hydroxide having a pH of at least 12; and then (b) coating with a heated aqueous phosphate solution having a pH of from about 4 to 6; and then (c) coating with a non-chrome sealant having a pH of from about 2.5 to 3.5; and then (d) drying the sealant to fill pores in the phosphate coating; and then (e) heating the coated metal member up to about 150° C. to 275° C.; and then (f) fuse bond coating the coated, heated metal member with a 100% solids, thermoset, filled, epoxy resin; and finally (g) painting the coated metal member with a pigment containing ultraviolet ray resistant paint.

Preferably, steps (a) through (f) are repeated before final painting in step (g) and the steel member is washed with water between steps (a) and (b), and between steps (b) and (c). Preferably, the metal member is steel, galvanized prior to any coating and the paint is a polyester/polyurethane paint.

This provides a thick extremely durable, totally corrosion resistant, UV resistant coated article for indoor or outdoor use for manufactured parts, which may be stamped, welded or machined prior to treating and coating. The process mostly uses solventless resins presenting minimal hazardous off-gases. The process also conforms to Underwriters Laboratories standards for safety "1995-UL-1332 Organic Coatings for Steel Enclosures for Outdoor Use Electrical Equipment" for exposure to salt spray, moist carbon dioxide/sulfur dioxide, and light/water, and the like.

BRIEF DESCRIPTION OF THE DRAWINGS

For a better understanding of the invention, reference may be made to exemplary embodiments shown in the accompanying non-limiting drawing which shows a block diagram of the method of this invention.

DETAILED DESCRIPTION OF THE PREFERRED EMBODIMENTS OF THE INVENTION

Referring now to the drawing, a metal article, usually steel, which has been galvanized, to be protectively coated, is shown as 10. This article can be, for example, the top lid for a transformer enclosure or tank as shown, or any other article which needs to be protected against corrosion and/or ultraviolet ("UV") radiation. The article 10 can be a stamped, welded or machined member used in a circuit breaker as a non current carrying part, such as the inside and exterior surfaces of a circuit breaker cover, springs used to raise the circuit breaker contact arm with a snap action when the primary latch is released, a variety of shafts and brackets used inside the circuit breaker, and the like. Other articles can include, but are not limited to, load center and metering enclosures, power outlet panels, air conditioning disconnects, safety switches, panel boards, switch gears, and motor control centers and enclosed controls.

The article or member 10 is first cleaned at cleaning station 14 with an aqueous solution of alkali hydroxide, such as potassium hydroxide or sodium hydroxide, having a pH of at least 12, preferably a pH of from about 13 to 14, usually by dipping or power spraying. Preferably, the cleaning solution will be heated by heater 15 to a temperature of from about 60° C. to 82° C. (140° F. to 180° F.) for improved cleaning performance. The cleaned article then passes to a water rinse or power spray station 16 which operates at about room temperature to rinse and cool the cleaned article to about 43° C. (110° F.). The cleaned article then passes to a phosphate bonderizing station 18 with an associated heater 20 where an aqueous phosphate solution, having a temperature of about 43° C. to 60° C. (110° F.–140° F.), is applied, usually by dipping or power spraying. The aqueous phosphate solution will have a pH of from about 4 to 6, preferably a pH of from 4.5 to 5.5. The phosphate solution can contain an alkali phosphate, such as monosodium phosphate or monopotassium phosphate, with minor amounts of acid, such as phosphoric acid and surfactant to insure good bonding. This phosphating step provides excellent adherence and bonding of subsequently applied layers. It is believed the phosphate provides an etched surface to allow the epoxy resin and paint to physically and chemically bond with the steel.

Next, the coated article is again passed to a water rinse or power spray station 22 which operates at about room temperature to thoroughly rinse and cool the phosphate bond coating to about room temperature, about 20° C. to 25° C. (68° F. to 77° F.). This rinse step should continue for about 20 seconds to one minute so that the surface of the article is wet when passed to the next station sealant station 24.

At the sealant station 24, the wet bonderized article is coated by a non-chrome sealant having a pH of from 2.7 and 3.3, by spray or immersion application at room temperature. There is no water rinse directly after sealant application. The sealant fills pores in the phosphate upon drying. It is believed the sealant enhances the rust protection, and seals/coats to assure the paint chemically bonds to the surface. The sealant can contain manganese/fluoride compounds in an acid such as an aqueous solution of phosphoric acid. The sealant is air died at drying station 26 and then the coated metal article is heated up to about 177° C. to 194° C. (350° F. to 380° F.) in heating station 30 by heater 28 in order to further dry the sealant.

At station 32 a powder containing a 100% solids, thermoset epoxy resin, containing filler particles is applied by electrostatic coating with coating gun 34. The powder can also be applied by flocking with air atomized powder or applied by fluidized bed processing. After the dryoff oven 30 the part is allowed to air cool to less than 32° C. (90° F.) at position 31 before powder coating. If it is too hot it will not coat correctly because the paint will try to set up as it is being applied. It then passes through the cure oven, section 44 of station 40, having a preferred temperature 210° C. to 227° C. (410° F. to 440° F.) for 18 minutes, which allows the part to reach a minimum temperature of 191° C. (375° F.) for a minimum of 10 minutes. A useful epoxy resin contains epoxy resin, an amide curing agent and filler such as mica, titanium dioxide or quartz silica. These coating resins are widely available, for example, from Minnesota Mining and Manufacturing Co. ("3M"™) under the trade name "Scotchkote"™ epoxy powder.

After resin coating at station 32, the epoxy coated metal article can be again passed through all of the stations 14, 16, 18, 22, 24, 26, 30 and 32, or through the stations: hot phosphate coating 18, rinse 22, sealant 24, drying and heating 26 and 30, and epoxy coating 32. Alternatively, after the first epoxy application at station 32, the epoxy coated article 38 can pass on to a final paint station 40. Conveyor belts 12 and 36 are shown transporting the article between stations, but any type of transport device can be used.

At station 40 the single or double epoxy coated article is coated with a paint, usually by air powder spray or preferably by electrostatic powder application using the manual touch up coating gun 42. The paint is UV resistant. A very useful paint coating is selected from a polyester, polyurethane or polyester/polyurethane base with grey, white or brown pigments. The epoxy coated article 38 is then finally cured in oven 44. The paint coated article 46 can then be assembled with other components, such as the transformer tank 48, or the like.

One or both phosphate layers applied at station 18 should be applied in an amount of between 10 to 30 mg per sq. ft. (0.9 to 2.8 mg per sq. meter); one or both sealant layers applied at station 24 should not have a measurable thickness after drying; while the epoxy and paint layers can have a thickness that varies widely depending whether the article is required to have close tolerances in, for example, a circuit breaker or whether the article can have a thick coating, such as top lid 46.

The invention will now be further illustrated by the following non-limiting example.

EXAMPLE

A galvanized steel meter enclosure was coated using pre-treating steps, epoxy coating, additional pre-treating steps, another epoxy coating step and a final painting step, somewhat similar to the sequence of step shown in the drawing.

First, the meter enclosure was cleaned by power spraying a 6% solution of potassium hydroxide, heated to 66° C. (150° F.), having a pH greater than 13.0 with a specific gravity of 1.20 to 1.30. The part was then washed with a power spray of water at room temperature to cool the part about 15° C. Then the part was bonderized with a power spray of hot phosphate solution for about two minutes. The phosphate solution was heated to about 43° C. to 60° C. (110° F. to 140° F.) before application, and had a pH of about 5.0. The phosphate solution contained about 10 wt. % to 30 wt. % monosodium phosphate and about 1 wt. % to 10 wt.

% each of fluoride, phosphoric acid and surfactant. This phosphate bonding agent is commercially available from Henkel Surface Technologies under the trade name "Bonderite® 1090". The article was then passed through a thorough water power spray for about 45 seconds to cool the article to about 25° C. (77° F.) and provide a wet surface for the following sealing step.

In the sealing step, the wet bonderized article was dipped in a room temperature solution of a non-chrome sealant, having a pH of about 3.0. The sealant contained about 1 wt. % to 10 wt. % each of phosphoric acid, fluoride, and manganese compound and is commercially available from Henkel Surface Technologies under the trade name "Parcolene®7100". The sealed article was then allowed to air dry for about 2.0 minutes after which it was heated to about 177° C. to 193° C. (350° F. to 380° F.) in an oven to provide a sealed surface hot enough for application of fuse bondable epoxy resin particles. The previous coating layers were very thin, about 10 to 30 mg per sq. ft. each, but the epoxy layer was thicker, about 0.030 mm to 0.088 mm. It was applied using an electrostatic spray gun. The epoxy resin particles each contained from about 10 wt. % to 70 wt. % thermosetting epoxy resin, about 30 wt. % to 40 wt. % total filler particles selected from a mixture of mica, titanium dioxide and quartz silica, about 1 wt. % to 5 wt. % green pigment, and about 1 wt. % to 3 wt. % dicyandiamide curing agent. It was a 100% solids epoxy resin, and is available commercially from Minnesota mining and Manufacturing Co. under the trade name "3M Scotchkote™ 134/135 Fusion Bonded Epoxy Coating". This epoxy coating was postcured in an oven for about 18 minutes at approximately 221° C. (428° F.).

Following this step, the article was again subjected to the previous process steps under the same conditions, including the alkaline wash. As a final step, the dual epoxy layered coating was painted using an electrostatic spray gun. The paint was a 100% solids polyester/polyurethane powder with grey pigment, which was applied to a thickness of about 0.05 mm at a temperature of less than 32° C. (90° F.). The paint additionally contained about 0.1 wt. % to 1.0 wt. % carbon black, about 10 wt. % to 30 wt. % calcium carbonate and about 10 wt. % to 30 wt. % titanium dioxide filler. It is commercially available from H. B. Fuller Co. under the trade name "IF-8359". The final exterior paint coating was then cured in an oven at 221° C. (430° F.) for about 18 minutes.

The coated article was then subjected in addition to U.L. 1332 tests, ASTM/G154 (U.V. Tests) and showed excellent adherence of all layers, excellent corrosion resistance and very good UV resistance.

It should be understood that the present invention may be embodied in other forms without departing from the spirit or essential attributes thereof, and accordingly, reference should be made to both the appended claims and to the foregoing specification as indicating the scope of the invention.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An article suitable for use in or to contain electrical equipment comprising: a metal member having successive coating layers of: a porous inner layer of phosphate; a layer of non-chrome sealant effective to fill pores in the inner layer of phosphate; a layer of thermoset, filled, epoxy resin; a porous second layer of phosphate; a layer of non-chrome sealant effective to fill pores in the second layer of phosphate; a second layer of thermoset, filled, epoxy resin; and an outer layer of pigment containing paint resistant to ultraviolet rays.

2. The article of claim 1, wherein the metal is steel.

3. The article of claim 1, wherein the metal is steel with a galvanized coating.

4. The article of claim 1, wherein the outer layer of paint comprises a resin selected from the group consisting of polyester, polyurethane and mixtures thereof, having a thickness of from about 0.030 mm to about 0.090 mm.

5. The article of claim 1, wherein at least one phosphate layer comprises alkali phosphate selected from the group consisting of monosodium phosphate, monopotassium phosphate and mixtures thereof.

6. The article of claim 1, where the total application of all coating layers is from about 0.9 to 2.8 mg per sq. meter.

7. The article of claim 1, being an exterior or interior circuit breaker component which would not be expected to carry current.

8. A method of coating a metal article comprising the sequential steps of:

a) cleaning the metal article with an alkali hydroxide having a pH of at least 12;

b) coating with a heated aqueous phosphate solution having a pH of from about 4 to 6;

c) coating with a non-chrome sealant having a pH of from about 2.5 to 3.5;

d) drying the sealant to fill pores in the phosphate coating;

e) heating the coated metal article up to about 177° C. to 194° C.;

f) fuse bond coating the coated, heated metal member with a 100% solid, thermoset, filled, epoxy resin; and g) painting the coated metal article with a pigment containing paint having ultraviolet ray resistance.

9. The method of claim 8, further comprising an aqueous wash step between steps (a) and (b) and between steps (b) and (c).

10. The method of claim 8, wherein the metal article is steel which is galvanized before step (a).

11. The method of claim 8, wherein steps (a) through (f) are repeated in sequence, once, before step (g).

12. The method of claim 8, wherein the paint comprises a resin selected from the group consisting of polyester, polyurethane and mixtures thereof, applied at a thickness of from about 0.030 mm to about 0.088 mm.

13. The method of claim 8, wherein the phosphate solution comprises alkali phosphate selected from the group consisting of monosodium phosphate, monopotassium phosphate and mixtures thereof.

14. The method of claim 8, further comprising, h) curing the article at a minimum temperature of 191° C.

15. The method of claim 8, wherein the total application of all coating layers is from about 0.9 to 2.8 mg/sq. meter.

16. The method of claim 8, where the aqueous phosphate applied in step (b) provides an etched surface for the epoxy resin.

17. The method of claim 8, where the non-chrome sealant applied in step (c) acts to help the epoxy resin chemically bond to the phosphate coating.

* * * * *